United States Patent [19]
Yamauchi et al.

[11] Patent Number: 5,314,771
[45] Date of Patent: May 24, 1994

[54] METHOD OF MANUFACTURING COLOR-FILTER-FITTED BOARD FOR LIQUID CRYSTAL DISPLAY

[75] Inventors: Shigekazu Yamauchi, Sagamihara; Shinji Kanagawa, Isehara; Hisao Sekine, Sagamihara, all of Japan

[73] Assignee: Stanley Electric Company Limited, Tokyo, Japan

[21] Appl. No.: 885,160

[22] Filed: May 18, 1992

[30] Foreign Application Priority Data

May 20, 1991 [JP] Japan .................................. 3-114314

[51] Int. Cl.$^5$ .............................................. G03F 9/00
[52] U.S. Cl. .......................................... 430/7; 430/6; 430/321
[58] Field of Search ..................... 430/7, 6, 321; 428/1; 350/317

[56] References Cited

U.S. PATENT DOCUMENTS

5,013,138  5/1991  Roosen et al. .......................... 430/7

*Primary Examiner*—Marion E. McCamish
*Assistant Examiner*—S. Rosasco
*Attorney, Agent, or Firm*—Gifford, Groh, Sprinkle, Patmore and Anderson

[57] ABSTRACT

When electrodes in two-layer composition, provided with a color filter in the inside thereof, are provided on the inner surface of a liquid crystal cell board, it is aimed to prevent creation of faulty connections in contact holes and to transmit a driving voltage normally even if faulty connections may occur. A first-layer transparent electrode 1a is formed on the board, then resist is coated so that the contact holes 6 are open on the side surface in one side of the electrode pattern, on which a color filter 3 is formed. After that, said resist is removed and a second-layer transparent electrode 1b is formed in film.

2 Claims, 4 Drawing Sheets

METHOD OF MANUFACTURING COLOR-FILTER-FITTED BOARD FOR LIQUID CRYSTAL DISPLAY

BACKGROUND OF THE INVENTION

1. Field of the Invention

The present invention relates to a method of manufacturing a color-filter-fitted board for a liquid crystal display, in which two layers of sheet-like electrodes with a color filter intercalated therebetween are formed on the inner surface of a board composing liquid crystal cells.

2. Description of the Prior Art

With a conventional simple matrix driving type liquid crystal color display, it is required to provide a sheet-like transparent electrode on a color filter for driving liquid crystal cells, in order to improve displaying performance. In addition, it is also needed to make a sheet resistance of the transparent electrode as small as possible, in order that a duty ratio for driving the liquid crystal cells is larger. Although it is effective to heat up said transparent electrode after a film-making process, to reduce the sheet resistance of said transparent electrode, a conventional color filter can resist a maximum temperature of about 270° C. At a temperature such as above, a maximum limit sheet resistance obtainable by forming a transparent electrode as thick as possible on the color filter is only about 20 Ω to 30 Ω. Therefore, as disclosed in the Unexamined Japanese Patent Application Laid Open No. 26628/88, the inventors of the present invention proposed a method to decrease the sheet resistance by providing transparent electrodes in two-layer composition.

FIG. 5 depicts part of said color-filter-fitted board with transparent electrodes in two-layer composition. In FIG. 5, numerals 1a and 1b represent transparent electrodes in two-layer composition, inside of which a color filter 2 is intercalated. In said color filter 2, a plurality of contact holes (through-holes) 3 is formed. Through said contact holes 3, a first-layer (lower) transparent electrode 1a and a second-layer (upper) transparent electrode 1b are connected electrically.

FIG. 6(a) to 69c) is a view for showing a process of manufacturing a color-filter-fitted board in the configuration described above, in which a section shape of the electrode pattern shown in FIG. 5 in a longitudinal direction is illustrated. First, as shown in FIG. 6(a), a film of a first-layer transparent electrode 1a is formed on the inner surface of a glass board 4 and heated up satisfactorily before forming a color filter in order to decrease a sheet resistance. A photoresist 5 is then coated at a predetermined location for forming said contact holes 3, on which a color filter 2 is formed by an electro-deposition method as shown in FIG. 6(b). Thereafter, as shown in FIG. 6(c), said photoresist 5 is removed thereby forming contact holes 3 on which a film of a second-layer transparent electrode 1b is formed.

With the color-filter-fitted board manufactured as described above, the second-layer transparent electrode 1b is electrically connected to the first-layer transparent electrode 1a through the contact holes 3, FIG. 7. That is, the first- and second-layer transparent electrodes 1a and 1b are connected parallel to each other. Consequently, an apparent resistance of the electrodes is substantially the same as that of the lower transparent electrode 1a, even if the sheet resistance of the upper transparent electrode 1b of the color filter 2 is not decreased.

In the above, it is required to make the size of said contact holes 3 such that no adverse affect is given to an indication quality of a display panel. Therefore, a diameter normally taken is about 20 μm to 30 μm. And, a method often employed conventionally to form microscopic contact holes 3 such as above in a satisfactory position accuracy is that, before forming a color filter 2 by an electro-deposition method, a photoresist 5 in the same shape as that of the contact holes 3 is pattern-formed on the transparent electrode 1a while peeling said photoresist 5 after completion of electro-depositing the color filter 2, as described above.

On the other hand, in order to have satisfactory color reproducibility using an electro-deposited color filter 2 such as described above, the film thickness of the color filter 2 is required to be more than about 1.7 μm. However, if the photoresist 5 is coated as thick as or more than the above for forming a microscopic pattern, development irregularities, etc. occur resulting sometimes in that the contact holes 3 are not formed in correct shapes. If the film thickness of the photoresist 5 is made to for instance 1.0 μm to 1.2 μm approximately to prevent the irregularities, etc., the thickness is smaller than the film thickness of the color filter 2 while forming the color filter 2 in such a manner that the filter covers up the pattern of the photoresist 5. Thus, the dimension of an opening of the contact holes 3 may disadvantageously become small in excess.

Normally, the shape of a contact hole 3 is a closed figure such as a circle, ellipse or a rectangular. Further, making a film of the transparent electrode 1b comprising ITO, etc. is performed often in a direction normal to the glass board 4. Therefore, if an area of the opening of a contact hole 3 is not satisfactory because of the reason described above, making a film on a side surface of the contact hole 3 cannot be performed satisfactorily resulting sometimes in faulty connection between the upper and lower transparent electrodes, though no such problems will occur provided the contact holes 3 are correctly formed.

In these circumstances, another method shown in FIG. 8 may also be considered, in which the shape of the contact holes 3 is made continuous to the side surface of the electrode pattern. At that time, however, if a connection error occurs in adjacent two contact holes 3 (for instance, between Portions α and β), no driving voltage is applied any longer to the transparent electrode 1b on the color filter 2 between said contact holes. Consequently, the portions are disabled to illuminate during displaying. Particularly with a dot matrix LCD panel used for full-color indication, the number of indication pixels in use is tens of thousands or hundreds of thousands or even more. Therefore, it is difficult to eliminate such pixels as disabled for illumination provided the shape of contact holes 3 is used as shown in FIG. 8. FIG. 9 depicts a section shape of the 9—9 line in FIG. 8.

In the above, disability of illumination owing to faulty connection between said contact holes occurs only with the contact holes in the shape of FIG. 8, but does not occur with those in the shape of FIG. 5. This is because, even when faulty connection occurs between contact holes 3 of the latter, a driving voltage is transmitted through adjacent normal contact holes 3.

Since conventional color-filter-fitted boards for liquid crystal displays are manufactured as described above, the dimension of an opening of the contact holes becomes small in excess where the contact holes are formed in closed shapes. At that time, making a film of an electrode on the side surface of a contact hole is not satisfactorily performed, resulting often in faulty connection. Also, if the contact holes are shaped in such a manner as continued toward the side surface of the electrode pattern, some pixels are sometimes disabled to illuminate because of faulty connection, causing a disadvantageous problem that no normal displaying can be activated.

The present invention has been accomplished from the viewpoint of the problems as described above, and is intended to provide such a method of manufacturing a color-filter-fitted board for a liquid crystal display, with which the occurrence of faulty connection in the contact holes can be prevented and, even if faulty connection in part of the contact holes occurs, a driving voltage can be transmitted and, therefore, there are no non-illumination pixels while maintaining normal displaying at any time.

SUMMARY OF THE INVENTION

According to the present invention, in the method of manufacturing a color-filter-fitted board in which two layers of sheet-like electrodes with a color filter intercalated therebetween are composed on the inner surface of a board composing liquid crystal cells, a first-layer electrode is formed on said board; then a resist for a contact hole is coated so that said contact hole is shaped to be open in the surface of both sides or one side of an electrode pattern; and thereon, a color filter is formed and said resist is removed; and then a second-layer electrode is formed and shaped. In addition, electrode connectors, 5 μm or more each, are provided continuously between each pixel on said color filter.

In the method of manufacturing a color-filter-fitted board for a liquid crystal display according to the present invention, the contact holes are shaped so that they are open in both sides or one side of the electrode pattern. Therefore, a large opening area of a contact hole can be taken, in which making an electrode film is accomplished satisfactorily from a side surface. In addition, even if faulty connection in said contact holes occurs, a driving voltage is transmitted through adjacent normal contact holes.

DESCRIPTION OF SYMBOLIC NUMERALS

1a  Transparent electrode
1b  Transparent electrode
2   Color filter
4   Glass board
6   Contact hole

DETAILED DESCRIPTION OF PREFERRED EMBODIMENTS

Figure 1:
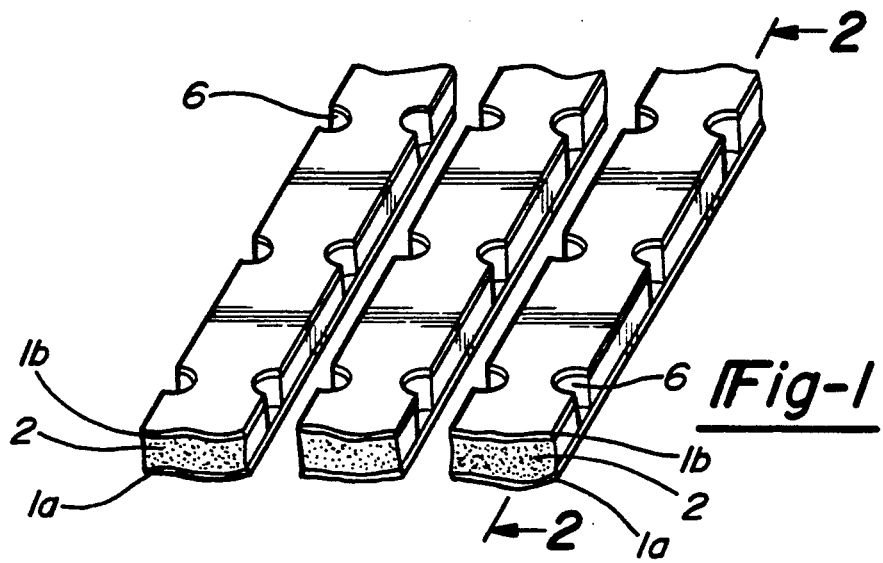
[FIG. 1] Oblique view for depicting a first embodiment of the present invention
Figure 2:
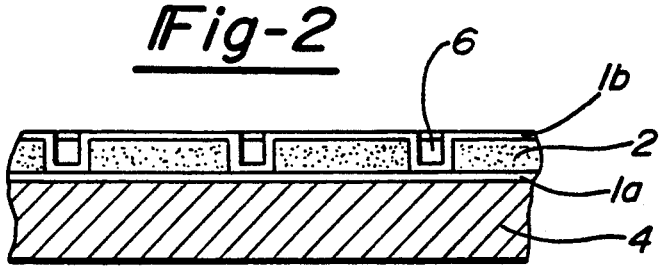
[FIG. 2] Line 2—2 section view of FIG. 1
Figure 5:
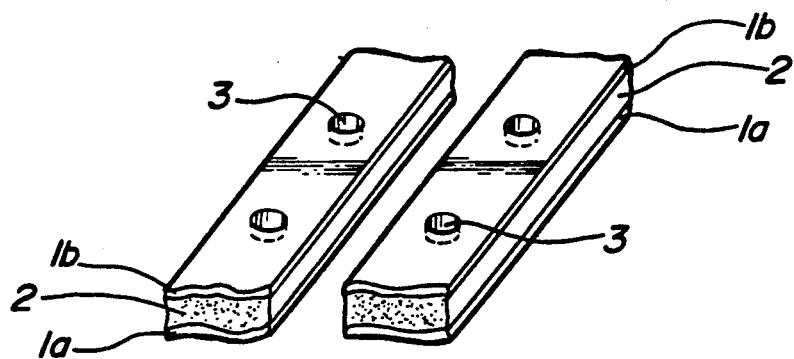
[FIG. 5] Oblique view for indicating a conventional example
Figure 6A:
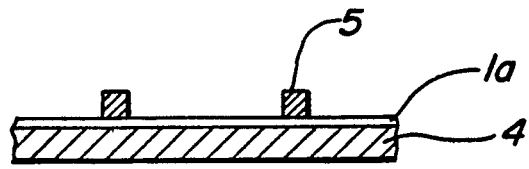
[FIG. 6(a) to 6(c)] Section view for indicating a process of manufacturing the color-filter-fitted board of FIG. 5
Figure 6B:
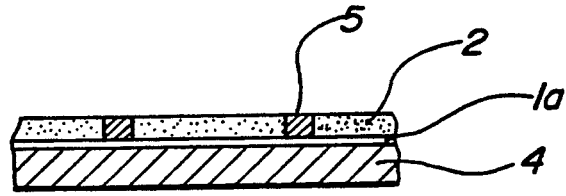
Figure 6C:
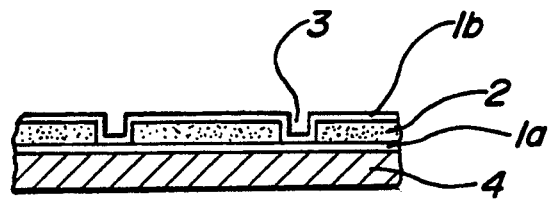
Figure 7:
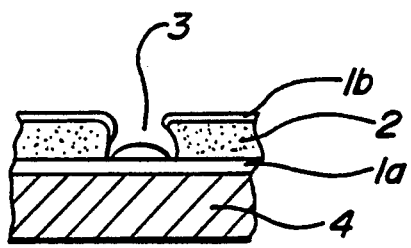
[FIG. 7] Section view for indicating the circumstances of formed film of contact holes
Figure 8:
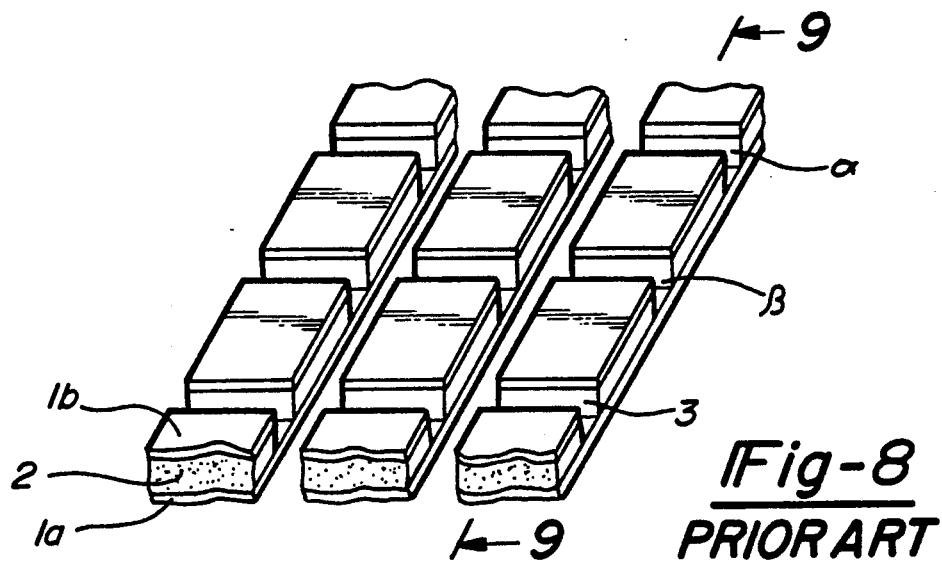
[FIG. 8] Oblique view for depicting another conventional example
Figure 9:
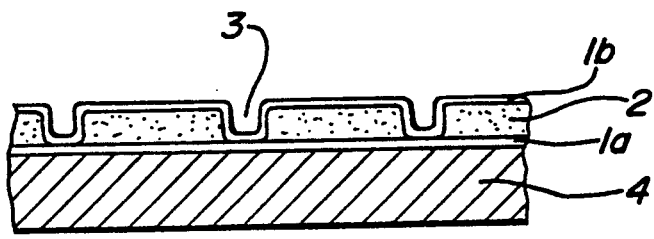
[FIG. 9] Line 9—9 section view of FIG. 8

FIG. 1 is an oblique view for depicting a first embodiment of the present invention, in which the same symbolic numerals as those of FIGS. 5 and 8 represent the same component portions. In FIG. 1, numerals 1a and 1b symbolize sheet-like transparent electrodes in two-layer composition while 2 and 6 representing a color filter intercalated between said two-layer transparent electrodes and contact holes formed in said color filter, respectively. (FIG. 2 also shows a section shape of Line B—B in FIG. 1. A color-filter-fitted board in the composition above is formed on the inner surface of a glass board 4 composing liquid crystal cells.

Next, a process of manufacturing said color-filter-fitted board is described in more detail in the following.

First, as the first-layer transparent electrode 1a, the glass board 4 in which the ITO with the sheet resistance thereof decreased to 10 Ω by a heat treatment is formed on the surface in such a stripe pattern as a pattern pitch of 115 μm and a pattern space of 20 μm are used. A photoresist for forming contact holes is coated in a film thickness of about 1 μm, on the ITO pattern of said glass board 4, and subject to patterning so that the contact holes 6 are shaped to be open on the side surface of the electrode pattern, by means of photo lithography. A color filter 2 in the 3 primary colors of R, G and B is regularly formed thereon by an electro-deposition method and after that, said photoresist is removed. Thereafter, a second-layer transparent electrode 1b is formed in a film The second electrode is applied as a layer on the color filter so that the contact holes electrically connect the second electrode layer to the first electrode layer.

Meantime, when said color-filter-fitted board was actually manufactured in the conditions above, the shape of the contact holes manufactured conformed to the shape of the photoresist when the film thickness of the color filter 2 was about 1 μm, regardless of the shapes of the contact holes. However, when the film thickness of the color filter 2 was 1.5 μm aiming at improving color reproducibility when the board was used as a LCD panel display, the diameter of the opening with a conventional 20 μm to 30 μm circular contact holes became as small as about 10 μm. Therefore, when the electrode film of ITO was created on the color filter 2 by for instance a sputtering method, the film on the inner side surface of the contact holes could not be created completely while bringing about non-illuminating pixels. However, with the contact holes 6 shown in FIG. 1 where the contact holes had the shape opened on the liquid crystal driving electrode surface according to the present embodiment, the film on the side surface was completely manufactured without non-illuminating pixels created, while bringing about normal displaying at any time.

In other words, the creation of faulty connections in the contact holes 6 was prevented by modifying the shape of the contact holes 6 such that there was an open section at least in the direction of one side in the space of lower adjacent electrodes as described above. In addition, even if faulty connections occurred in part of the contact holes, a driving voltage could be transmitted normally. Therefore, non-illuminating pixels were completely eliminated while obtaining normal displaying functions at any time.

Figure 3:
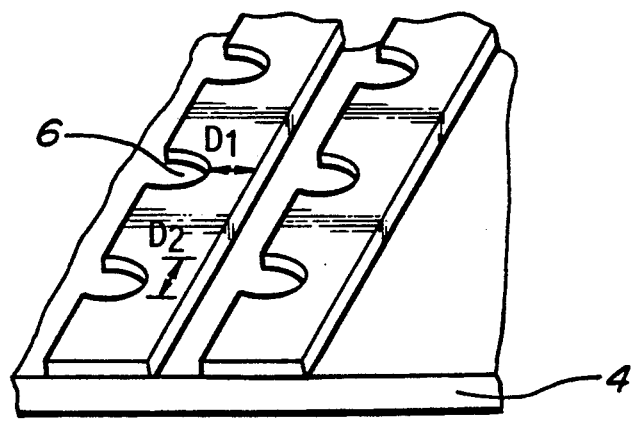
[FIG. 3] Oblique view for denoting a second embodiment of the present invention

FIG. 3 is an oblique view depicting a second embodiment of the present invention. With this embodiment, the contact holes 6 are formed larger with openings provided only in one side of the electrode pattern. Even with such a shape of the contact holes as shown in FIG. 3, a similar effect to that of the first embodiment can be obtained. However, with the second embodiment, percent defective increases owing to a side-etching effect where a marginal width D1 of the pattern becomes less than 5 μm. Therefore, the width D1 should preferably be more than 5 μm. Likewise, it is preferred that the width D2 is made more than 5 μm also in the stripe direction. That is, it is more advantageous that electrode connections, each more than 5 μm, are provided continuously between each pixel on the color filter 2, in addition to the modification of the shape of the contact holes 6 to that as detailed above.

Figure 4A:
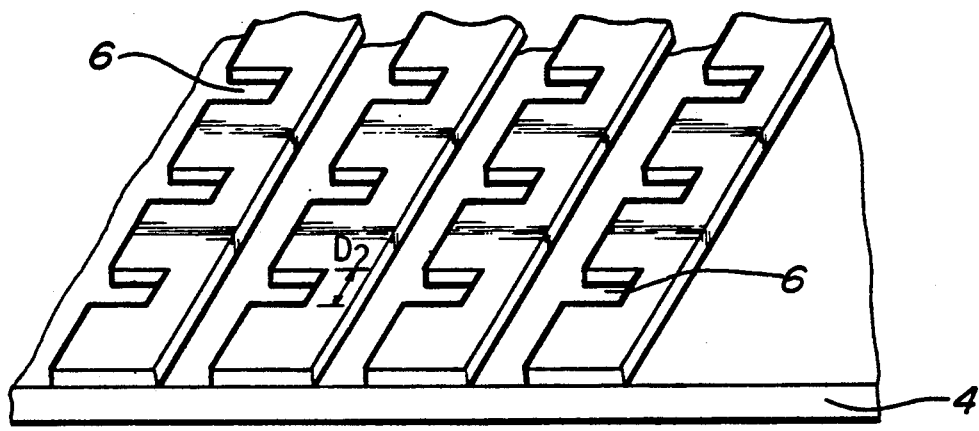
[FIG. 4(a) and 4(b)] Oblique view for denoting a third embodiment of the present invention
Figure 4B:
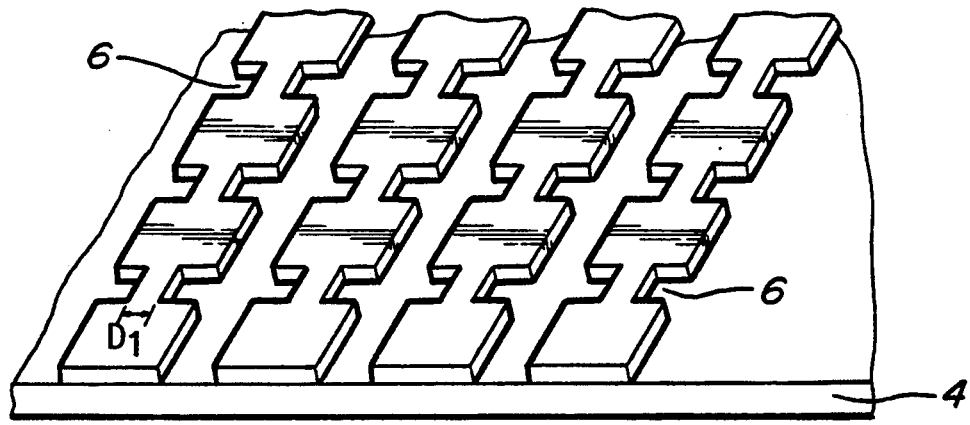

FIG. 4(a) and 4(b) are oblique views depicting a third embodiment of the present invention. This embodiment takes a larger shape of the contact holes 6 in the same manner as with the embodiment of FIG. 3. However, the shape is not circular but rectangular. In addition, the location of openings is classified into two types; the first type is shown in FIG. 4(a) where the openings are provided only in one side of the electrode pattern while denoting the second type of FIG. 4(b) in which there are openings in both sides. With both types, it is preferred that the widths D1 and D2 are more than about 5 μm, like with the embodiment of FIG. 3.

According to the present invention as described above, since the contact holes are shaped so that the holes are open on the side surface of both sides or one side of the electrode pattern, the occurrence of faulty connections in the contact holes can be prevented. Even if faulty connections may unexpectedly occur in part of the contact holes, a driving voltage can be transmitted normally. Consequently, non-illuminating pixels are not manufactured and the board can display normally at any time as an advantageous effect.

What is claimed is:

1. A method of manufacturing a color filter on a board composed of liquid crystal cells, said method comprising the steps of:

applying a first transparent electrode layer having a side on said board;

coating a photoresist on portions of said first transparent layer so that at least one portion of said photoresist is in contact with the side of the first electrode layer;

layering a color-filter on said first electrode layer and around said portions of said photoresist;

removing said photoresist to create at least one contact hole open to the side of said first electrode layer; and applying a second transparent electrode layer on said color filter so that said contact hole electrically connects said second electrode layer to said first electrode layer.

2. The method of manufacturing a color filter on a board as described in claim 3, further comprising the step of forming electrode connectors, 5 μm or more each, continuously between each pixel on said color filter.

* * * * *